United States Patent [19]

Chiang et al.

[11] Patent Number: 5,720,003
[45] Date of Patent: Feb. 17, 1998

[54] METHOD AND APPARATUS FOR DETERMINING THE ACCURACY LIMIT OF A LEARNING MACHINE FOR PREDICTING PATH PERFORMANCE DEGRADATION IN A COMMUNICATIONS NETWORK

[75] Inventors: Wan-Ping Chiang, Colts Neck, N.J.; Corinna Cortes, New York, N.Y.; Lawrence David Jackel, Holmdel; William Lee, Lincroft, both of N.J.

[73] Assignee: Lucent Technologies Inc., Murray Hill, N.J.

[21] Appl. No.: 390,183

[22] Filed: Feb. 17, 1995

Related U.S. Application Data

[63] Continuation-in-part of Ser. No. 330,282, Oct. 27, 1994.
[51] Int. Cl.⁶ .................................................. G06F 15/18
[52] U.S. Cl. .................................................. 395/23; 395/11
[58] Field of Search ................................... 395/11, 23

[56] References Cited

U.S. PATENT DOCUMENTS

| | | | |
|---|---|---|---|
| 5,033,006 | 7/1991 | Ishizuka et al. | 395/23 |
| 5,563,983 | 10/1996 | Nozaki et al. | 395/23 |
| 5,590,218 | 12/1996 | Ornstein | 395/23 |

OTHER PUBLICATIONS

Bös, S. et al., "Generalization Ability of Perceptions with Continuous Outputs," Physical Review E, vol. 47, No. 2, pp. 1384–1391, Feb. 1993.

Chiang, W.-P., Cortes, C., Jackel, L.D., LeCun, Y., and Lee, W., "Accuracy Limits of Machine Learning: Predicting Communication Path Degradation or Failure," Presented at Symposium on Intelligent Systems in Communications and Power, Puerto Rico, Feb. 21–23, 1994.

Cortes, C., "Prediction of Generalization Ability in Learning Machines," PhD Thesis, University of Rochester, NY, 1993.

Cortes, C., et al., "Learning Curves: Asymptotic Valuers and Rate of Convergence," Advances in Neural Information Processing Systems, vol. 6, Morgan Kaufman, 1994.

Fine, T.L., "Statistical Generalization and Learning," Technical Report EE577, Cornell University, Fall 1993.

Hornik, K., et al., "Multilayer Feedforward Networks Are Universal Approximators," Neural Networks, vol. 2, pp. 359–366, 1989.

Kohonen, T., et al., "Statistical Pattern Recognition with Neural Networks: Benchmarking Studies," Proc. IEEE Int. Conf. on Neural Networks, ICNN–88, vol. 1, pp. I–61–I–68, 1988.

Murata, N., et al., "Learning Curves, Model Selection, and Complexity of Neural Networks," Advances in Neural Information Processing Systems, vol. 5, pp. 607–614, Morgan Kaufman, 1992.

Seung, H.S., et al., "Statistical Mechanics of Learning Form Examples," Physical Review A, vol. 45, No. 8, pp. 6056–6091, Apr. 15, 1992.

(List continued on next page.)

Primary Examiner—George B. Davis

[57] ABSTRACT

A method and apparatus for determining the accuracy limit of a learning machine for predicting path performance degradation imposed by the quality of the path performance data is disclosed. A plurality of learning machines of increasing capacity are trained using training data and tested using test data, and the training error rates and test error rates are calculated. The asymptotic error rates of the learning machines are calculated and compared. When the change in asymptotic error rate falls below a certain rate, the asymptotic error rate estimates the accuracy limit for a learning machine for predicting path performance degradation. The accuracy limit is derived from insufficiencies in the path performance data and is applicable to any learning machine trained on and applied to the path performance data, regardless of the complexity of the learning machine or the size of the training data set.

24 Claims, 8 Drawing Sheets

OTHER PUBLICATIONS

Marko et al, "Automotive Diagnostics Using Trainable Classifiers: Statistical Testing and Paradigm Selection", IJCNN, Jun. 1990.

Tishby et al, "Consistent Inference of Probabilities in Layered Networks: Predictions and Generalization", IEEE, ICNN 1989.

Simpson et al, "Classification of Enceratium Gran. In Neural Networks", IEEE Neural Network for Ocean Engineering, 1991.

METHOD AND APPARATUS FOR DETERMINING THE ACCURACY LIMIT OF A LEARNING MACHINE FOR PREDICTING PATH PERFORMANCE DEGRADATION IN A COMMUNICATIONS NETWORK

This application is a continuation-in-part of patent application Ser. No. 08/330,282, filed Oct. 27, 1994.

FIELD OF THE INVENTION

This invention relates generally to learning machines. More particularly, this invention relates to determining the accuracy limit of a learning machine for predicting path performance degradation in a telecommunications network, imposed by the quality of the path performance data.

BACKGROUND OF THE INVENTION

In general, a "learning machine" is a device that takes an unknown input vector and produces an output vector. More particularly, it performs a mapping function from an input space to an output space. Thus, given certain input data, the learning machine will classify the data and assign a label to the data. For example, consider handwriting recognition. The input data to the learning machine may be digital data representing a scanned image of a handwritten alphabetic character. The learning machine will receive the input data, analyze it, and classify it as an alphabetic character and assign to the data a label corresponding to the character.

The particular mapping implemented by a learning machine depends on the setting of internal parameters of the learning machine. These parameters are adjusted by a learning algorithm during a training phase wherein a training data set is provided to train the learning machine. The training data set contains input data along with labels indicating the correct classification of the input data. The learning algorithm adjusts the internal parameters so that the labels produced by the learning machine in response to the training set match, as well as possible, their provided labels. The number of patterns that the machine can match is called the "capacity" of the machine. Generally, the capacity of a machine increases with the number of free parameters. After training is complete, the generalization ability of the machine is estimated by its performance on a test data set, which the machine has not previously analyzed.

Examples of known learning machines are neural networks and learning vector quantization machines. Briefly, neural networks are parallel networks of non-linear input-output units, interconnected by adaptive connections or weights. The most common architecture consists of layers of units, where the outputs from one layer of units serve as inputs to the next layer of units. The first layer of units receives the input data and is called the input layer. The output from the last layer of units represents the network's classification of the given input and is called the output layer. Any layer of units between the input and output layer is called a hidden layer. The capacity of a neural network is approximated by the number of adaptive weights in the network.

Briefly, a learning vector quantization machine categorizes a training set of input vectors into a number of classes and labels each input vector according to the class label. The classes are each defined by a codebook vector, and the class membership of an input vector is determined by finding the nearest codebook vector using the sum of squared distances (the ordinary Euclidean metric). The number of codebook vectors is determined before training, and their location adjusted during training. The capacity of a learning vector quantization machine is approximately the number of codebook vectors.

Learning machines of the type described herein are well known to those skilled in the art. Thus, the details of the structure, training and testing of such machines will not be discussed further herein, with the understanding that such machines and techniques are well known and could be readily implemented by one skilled in the art. For general background on learning machines, see generally, J. Hertz, A. Krogh, and R. G. Palmer, *Introduction to the Theory of Neural Computation*, Addison-Wesley, 1991.

The data on which the learning machine operates must be collected by some process. Such data collection for a classification task is prone to random errors, e.g., inaccuracies in the measurement of the input or mislabeling of the output. Missing or insufficient data are other sources that may complicate a learning task and hinder accurate performance of the trained machine. These insufficiencies of the data limit the performance of any learning machine trained on and applied to the data collection, regardless of how complex the machine or how much data is used to train it.

In a telecommunications network, for example, characteristics of network performance are constantly monitored and path performance data is stored in network databases to ensure the highest possible quality of service in the network. Frequently, a path in the telecommunications network will provide an early warning of an impending failure by first showing minor degradations in performance. For binary signals, this warning of impending failure may appear, for example, as information synchronization errors or increased bit-error rates. It is important to note, however, that minor degradations in the path performance may not always be an indication of upcoming trouble. For example, the performance degradation may go away, for example, following a change in atmospheric conditions, or be sufficiently isolated and of such a short duration that the performance degradation will not have a significant impact on the overall quality of network service.

Thus, the quality of service in a telecommunications network is typically maintained by employing corrective measures, whereby action is taken to maintain reliable service, such as rerouting calls or switching lines, once certain performance degradation measures exceed preset thresholds. The requirement for a corrective measure typically indicates that the service quality may already be poor. In addition, the corrective action typically causes short, minor impairments of the quality of the communication path.

Learning machines are increasingly being utilized to make predictions about when a communication path is likely to exhibit significant performance degradation or failure in the future. In this manner, the quality of service is maintained by employing preventive measures. If the predictions of the learning machine are sufficiently accurate, preemptive repairs can be made to the affected communication paths at convenient times, such as during periods of low network traffic, and before a major performance degradation occurs.

The learning machines make predictions about the future performance of a communication path by analyzing historical performance data of the path. The learning machine will assign a label to the data indicating whether or not the associated communication path will likely exhibit further performance degradation in the future. During the training phase, the learning machine utilizes a learning algorithm to analyze a training data set, comprised of the historical path performance data and a label indicating whether the path associated with the data experienced a performance degradation in a future period following the historical period. The learning machine adjusts internal parameters during the training phase so that the labels produced by the learning machine in response to the training set match, as well as possible, the indicated labels.

Once the training phase of the learning machine is complete, the classification ability, or accuracy, of the machine is estimated by analyzing a test data set, comprised of additional performance data sets, which the learning machine has not previously analyzed. The accuracy of the learning machine on the test data set can be utilized to determine if the learning machine is sufficiently accurate for its intended purpose.

Generally, the accuracy of the predictions made by the learning machine may be increased by increasing the size of the training data set or by locating a learning machine with a more suited capacity, which provides a better match between the flexibility of the learning machine and the amount and quality of the available training data. As previously indicated, the capacity of a learning machine increases with the number of free parameters. Thus, in theory, if the tested accuracy of the learning machine is not sufficient for its intended purpose, then the accuracy may be further increased by increasing the size of the training data set or by varying the number of free parameters.

It has been found, however, that the quality of the path performance data being analyzed by the learning machine imposes limits on the performance of any learning machine trained on and applied to the performance data, regardless of the complexity of the machine or the size of the training data set.

It is therefore desirable to have a method and apparatus for determining the performance limitation of a learning machine for predicting path performance degradation in a telecommunications network, which is imposed by the inherent quality of the path performance data. In this manner, the anticipated investment of resources that is required to increase the accuracy of the learning machine may be compared with the cost benefits of the improved learning machine.

SUMMARY OF THE INVENTION

This invention discloses a method and apparatus for estimating the accuracy limit of learning machines for predicting path performance degradation in a telecommunications network imposed by the quality of the path performance data utilized to train and test the learning machine.

A learning machine is trained using a training data set, and the training error is calculated. A learning machine for predicting path performance degradation is trained to predict whether communication paths will likely exhibit a performance degradation in the future. The trained learning machine is then tested using a test data set, and the test error is calculated. The asymptotic error rate for the learning machine is calculated as the mean of the training error and test error. These steps are repeated for learning machines of increasing capacity until the asymptotic error rate represents an acceptable estimation of the limiting performance of the learning machine on the given path performance data.

The asymptotic error rate estimates the accuracy limit for a learning machine for predicting path performance degradation. The accuracy limit is derived from insufficiencies in the path performance data and is applicable to any learning machine trained on and applied to the performance data, regardless of the complexity of the learning machine or the size of the training data set.

The advantages of the present invention will be apparent to those of ordinary skill in the art by reference to the following detailed description and the accompanying drawings.

DETAILED DESCRIPTION

Figure 1:
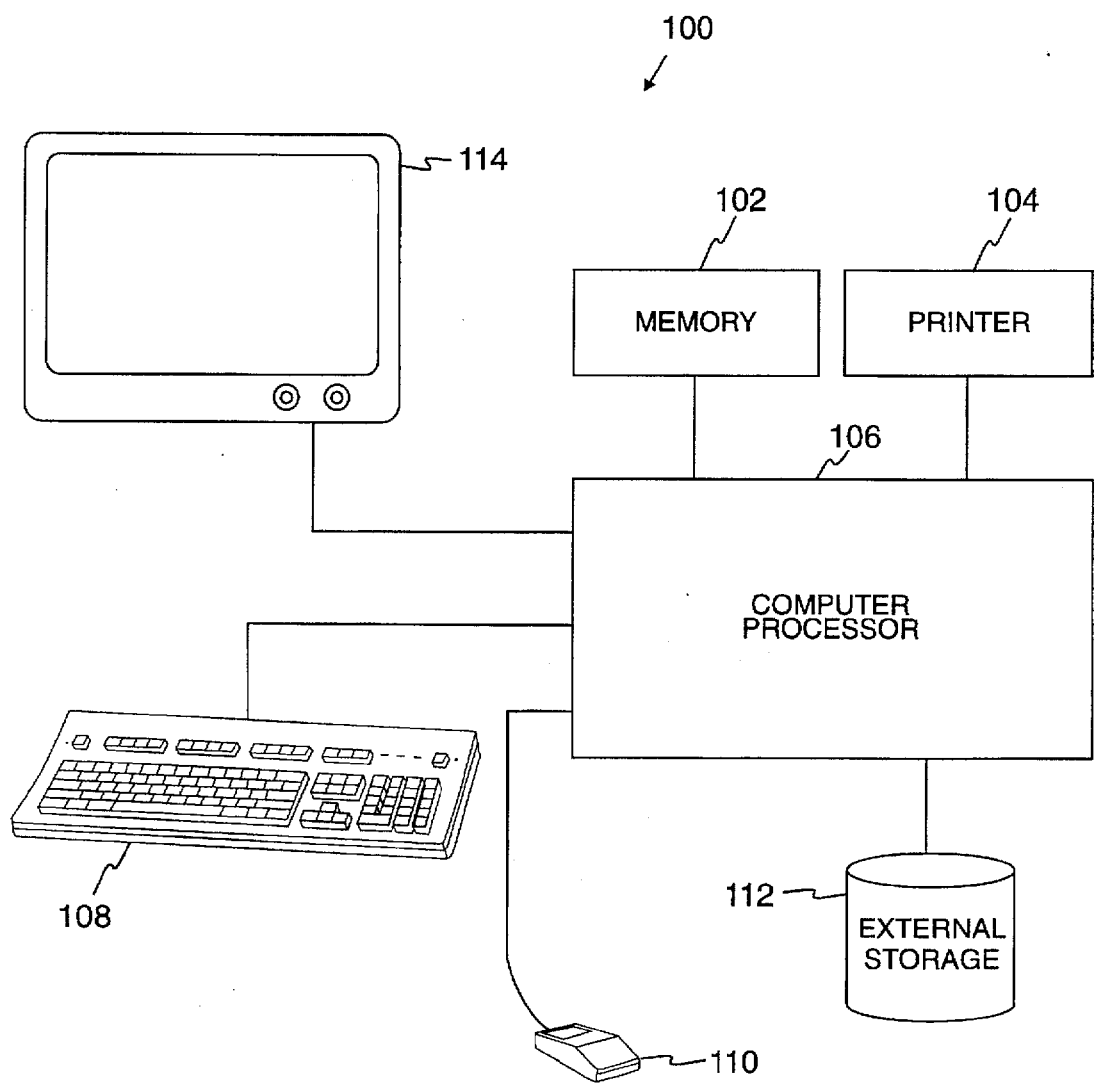
FIG. 1 shows a schematic of the components of a computer system which can be used in accordance with the present invention.

The system described herein may be implemented using one or more programmed digital computers of the type well known in the art and shown in FIG. 1. FIG. 1 shows a computer system 100 which comprises output devices such as a computer display monitor 114 and a printer 104, a textual input device such as a computer keyboard 108, a graphical input device such as a mouse 110, a computer processor 106, a memory unit 102, and an external storage device such as a disk drive 112. The computer processor 106 is connected to the display monitor 114, the printer 104, the memory unit 102, the external storage device 112, the keyboard 108, and the mouse 110. The external storage device 112 and the memory unit 102 may be used for the storage of data and computer program code. The functions of the present invention may be performed by the computer processor 106 executing computer program code which is stored in the memory unit 102 or the external storage device 112. The computer system 100 may suitably be any one of the types which are well known in the art such as a mainframe computer, a minicomputer, a workstation, or a personal computer.

As discussed above, a learning machine may be used to classify input data and to assign labels to the input data. An error is committed by the learning machine when it incorrectly classifies input data and assigns an incorrect label. This may occur during both training and testing. The error rate of the learning machine during the training phase is called the training error. The error rate of the learning machine during the test phase is called the test error.

The training of a learning machine is briefly described with reference to FIG. 2, which shows a learning machine 302 comprising a classifier 301 and a training algorithm 312. The classifier 301 includes a set of internal adjustable parameters 304. The number of these internal adjustable parameters 304 generally determines the capacity of the learning machine 302.

The training data set is shown as 306. As discussed above, the training data set 306 consists of vector input data 308 and associated labels 310. During the training phase, the vector input data 308 is provided to the classifier 301 of the learning machine 302 and associated labels 310 are provided to the training algorithm 312 of the learning machine 302. The training algorithm 312 trains the classifier 301 by adjusting its internal parameters 304. The classifier 301 classifies the vector input data 308 and assigns labels 314. The assigned labels 314 are provided to the training algorithm 312 in order to compare the provided labels 310 to the assigned labels 314. The training algorithm 312 computes the training error rate 316 based on the number of correctly and incorrectly assigned labels.

The testing of the trained learning machine 302 is briefly described with reference to FIG. 3, which shows the classifier 301 of the learning machine 302 and its internal parameters 304 which were set during the training phase discussed above in conjunction with FIG. 2. During testing, a test data set 320 is used to test the classification ability of the learning machine 302. This test data set 320 is independent of the training data set 306 used during training. The vector input data 322 is provided to the classifier 301 of the trained learning machine 302. Based on the internal parameters 304, the classifier 301 classifies the vector input data 322 and assigns labels 326 to the data. These assigned labels 326 are provided to a compare algorithm 328. The associated labels 324 from the test data set 320 are also provided to the compare algorithm 328. The compare algorithm 328 compares the provided labels 324 to the assigned labels 326 and computes the test error rate 330 based on the number of correctly and incorrectly assigned labels.

Figure 2:
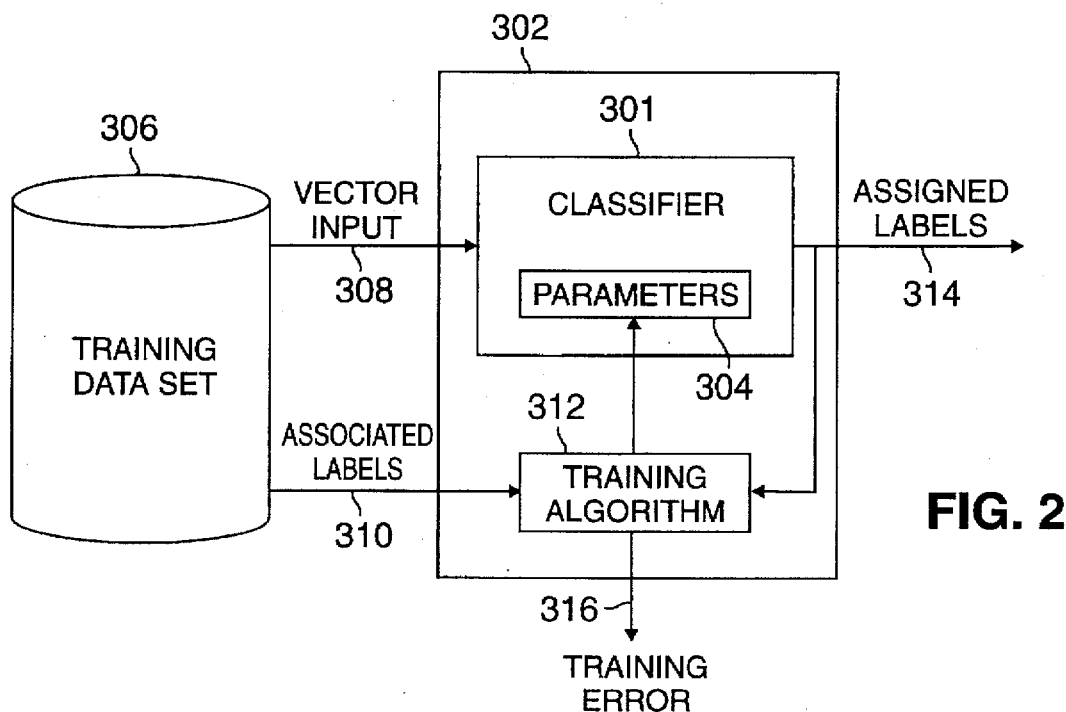
FIG. 2 shows a block diagram of a system for training a learning machine.
Figure 3:
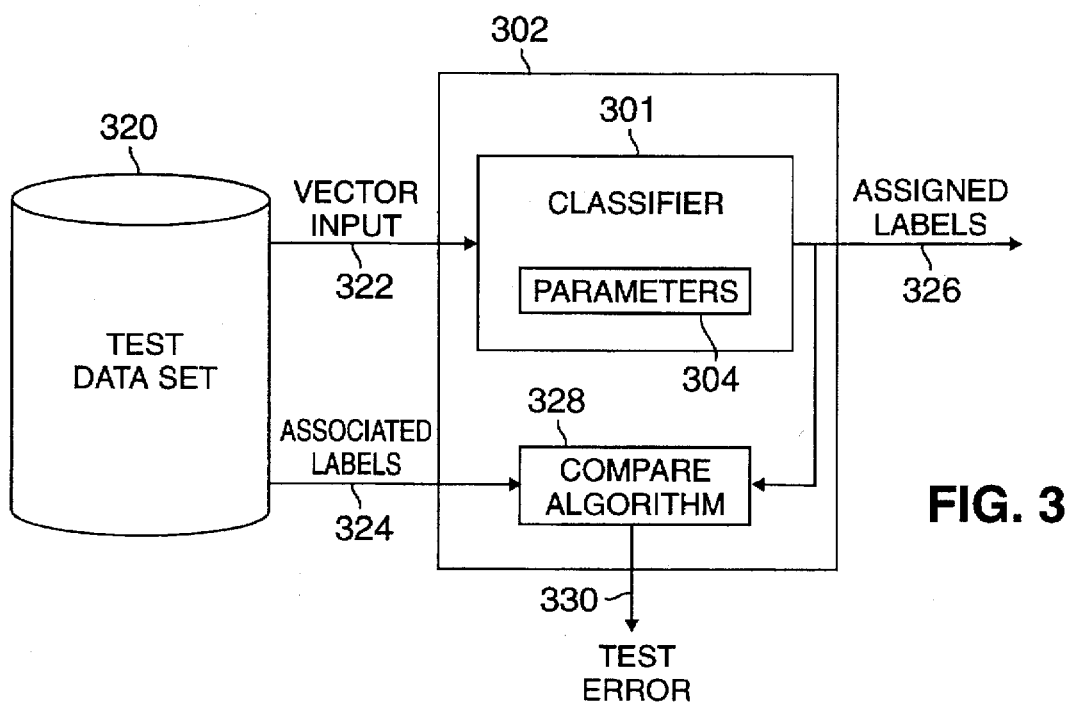
FIG. 3 shows a block diagram of a system for testing a learning machine.

FIGS. 2 and 3 show various components of the learning machine 302, such as the classifier 301, internal parameters 304, training algorithm 312 and compare algorithm 328, as separate components. However, it should be understood that in the preferred embodiment, the learning machine 302 is implemented with a digital computer system of the type shown in FIG. 1. In such an implementation, the various components of the learning machine 302 are implemented through the use of stored computer program code being executed by the computer processor in a manner well known in the art. Thus, FIGS. 2 and 3 show the learning machine 302 containing different components during the learning phase and testing phase only to more clearly describe the functioning of the learning machine during those phases.

The test error and training error depend on the size l of the training data set, the capacity h of the learning machine and how well suited the machine is to implement the task at hand. This suitability depends on both the architecture of the learning machine and the training algorithm. The architecture of the learning machine determines a family of mappings that the learning machine can implement. The learning algorithm determines which of these mappings is realized by the trained machine. A well suited architecture will, in its family of mappings, contain good matches to the task at hand. A well suited training algorithm will locate the best, or only slightly sub-optimal, mapping.

Figure 4:
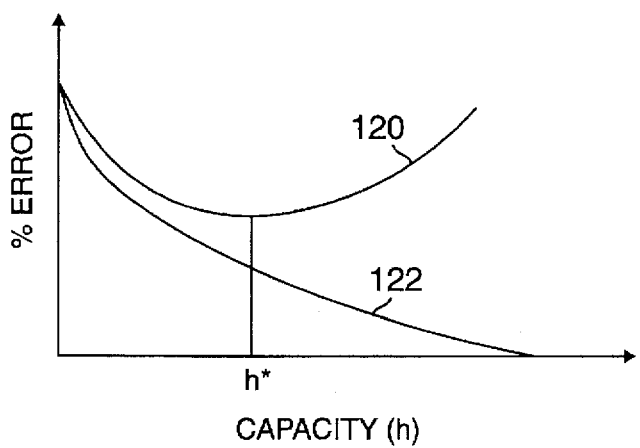
FIG. 4 shows training error and test error as a function of learning machine capacity for a fixed training set size.

FIG. 4 shows typical training error 122 and test error 120 as a function of the capacity h of a learning machine. FIG. 4 shows the typical behavior of the test error 120 and training error 122 for a task as the capacity h is varied but the amount of training data l is fixed. This scenario can be obtained by increasing the number of hidden units where the learning machine is a neural network or by increasing the number of codebook vectors in a learning vector quantization machine. See, T. Kohonen, G. Barna, and R. Chrisley, *Statistical Pattern Recognition with Neural Networks: Benchmarking Studies,* Proc. IEEE Int. Conf. on Neural Networks, ICNN-88, vol. 1, page I-61–I-68, 1988. For h<1 there are many fewer free parameters than training examples and the machine is over constrained. It does not have enough complexity to model the regularities of the training data, so both the training error 122 and test error 120 are large. This situation is called underfitting. As h increases the learning machine can begin to fit the general trends in the data which carries over to the test set, so both the training error 122 and test error 120 decline. Since the performance of the machine is optimized on only part of the full pattern space, the test error 120 will always be larger than the training error 122. As the capacity h of the learning machine increases the training error 122 continues to decline, and eventually it reaches zero when there are enough free parameters to completely model the training data set. The behavior of the test error 120 is different. Initially it decreases, but at some capacity, h*, it starts to rise. The rise occurs because the ample resources of the training machine are applied to learning vagaries of the training set, which are not reproduced in the test set. This situation is called overfitting. The optimal, or lowest, test error 120 is achieved at a capacity h* that is typically smaller than the capacity for which zero error is achieved on the training set. The learning machine with capacity h* will typically commit errors on misclassified or outlying patterns of the training set.

Figure 5:
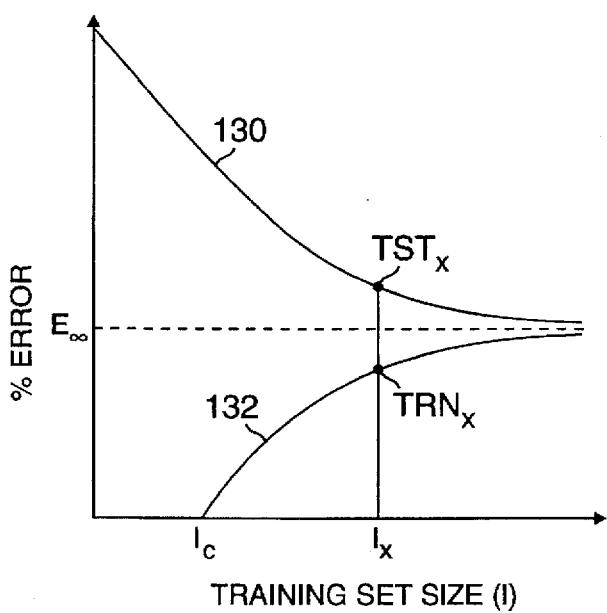
FIG. 5 shows training error and test error as a function of training set size for a fixed learning machine capacity.

FIG. 5 shows the test error 130 and training error 132 as a function of the training set size l for fixed capacity h of a learning machine. This scenario can be obtained by training the learning machine on increasingly larger training data sets. Where l is small there are enough free parameters to completely model the training set, so the training error 132 is zero. Excess capacity is used by the learning machine to model details in the training set, leading to a large test error 130. As the training set size l is increased the learning machine is trained on more patterns so the test error 130 declines. For some critical size of the training set, $l_c$, the learning machine can no longer model all the training patterns and the training error 132 starts to rise. As l is increased, the irregularities of the individual training patterns smooth out, and the parameters of the learning machine are utilized to model the true underlying function. The test error 130 declines, and asymptotically the training error 132 and test error 130 reach the same error value $E_{l\infty}$. This error value is the limiting performance of the given learning machine to the task. In practice we never have the infinite amount of training data needed to achieve $E_{l\infty}$. However, $E_{l\infty}$ can be estimated by averaging the training error 132 and test error 130 at a point where $l>l_c$. See, H. S. Seung, H. Sompolinsky, and N. Tishby, *Statistical Mechanics of Learning From Examples,* Physical Review A, Vol. 45, No. 8 pp. 6056–6091, Apr. 15, 1992; S. Bös, W. Kinzel, and M. Opper, *Generalization Ability of Perceptions with Continuous Outputs,* Physical Review E, Vol. 47, No. 2, pp. 1384–1391, February 1993; C. Cortes, *Prediction of Gen-* eralization Ability in Learning Machines, PhD Thesis, University of Rochester, N.Y., 1993; N. Murata, S. Yoshizawa, and S. Amari, *Learning Curves, Model Selection, and Complexity of Neural Networks*, Advances in Neural Information Processing Systems, Vol. 5, pp. 607–614, Morgan Kaufman, 1992; T. L. Fine, *Statistical Generalization and Learning*, Technical Report EE577, Cornell University, Fall 1993; and C. Cortes, L. D. Jackel, S. A. Solla, V. Vapnik, and J. S. Denker, *Learning Curves: Asymptotic Values and Rate of Convergence*, Advances in Neural Information Processing Systems, Vol. 6, Morgan Kaufman, 1994. In this manner the optimal performance of a given machine can be predicted.

Thus, the asymptotic error value $E_\infty$ for a given learning machine can be calculated by training the learning machine with a training data set with a size greater than $l_c$. For example, referring to FIG. 5, suppose the learning machine is trained using a training set of size $l_x$. The machine is then tested using the test data set, and the test error $TST_x$ and the training error $TRN_x$ are calculated. The error value $E_\infty$ is calculated as:

$$E_\infty = \frac{TST_X + TRN_X}{2}.$$

The resulting value of $E_\infty$ represents the lowest test error rate which can be expected with the given learning machine and the given data.

Figure 6:
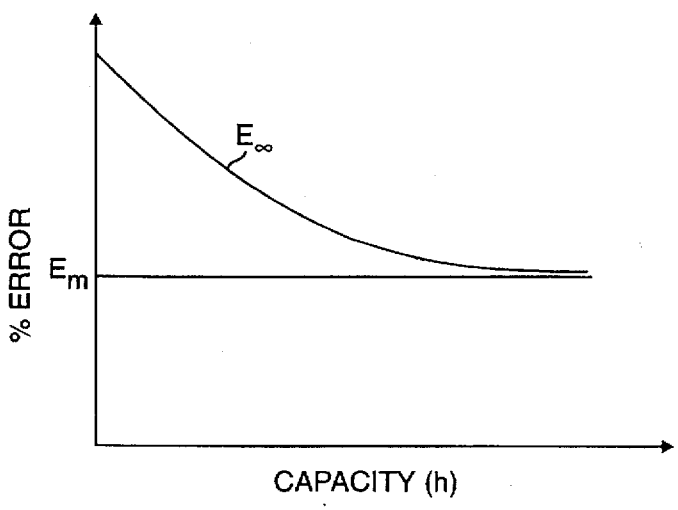
FIG. 6 shows the asymptotic error rate as a function of learning machine capacity.

The value of the asymptotic error $E_\infty$ of a given machine depends on the quality of the data and the set of functions the machine can implement. The set of available functions increases with the capacity of the machine, so low capacity machines will typically exhibit a high asymptotic error $E_\infty$ due to a large difference between the true noise-free function of the patterns and the function implemented by the learning machine. As h increases this difference decreases. Eventually the difference reaches zero, so the asymptotic error $E_\infty$ only measures the intrinsic noise level of the data. When the actual capacity of the machine matches the complexity of the true function, no further improvement in $E_\infty$ can be achieved. Such a capacity is called the desired capacity. FIG. 6 shows how the error rate decreases as the capacity h of the learning machine increases. The error rate $E_\infty$ will asymptotically reach a minimum value which represents the lowest test error rate which can be achieved on the given data, independent of the learning machine.

It is assumed herein that $E_\infty$ decays approximately linearly in the ratio of actual to desired capacity as shown in FIG. 6. However, in certain cases, $E_\infty$ may exhibit several plateaus or may be discontinuous with the increasing capacity of the learning machine. Such cases are not considered herein because they rarely occur in actual implementation.

Thus, the intrinsic noise level of the data or the limiting performance of any learning machine may be estimated as the asymptotic value of $E_\infty$ as obtained for learning machines with increasing capacity applied to the task.

Figure 7:
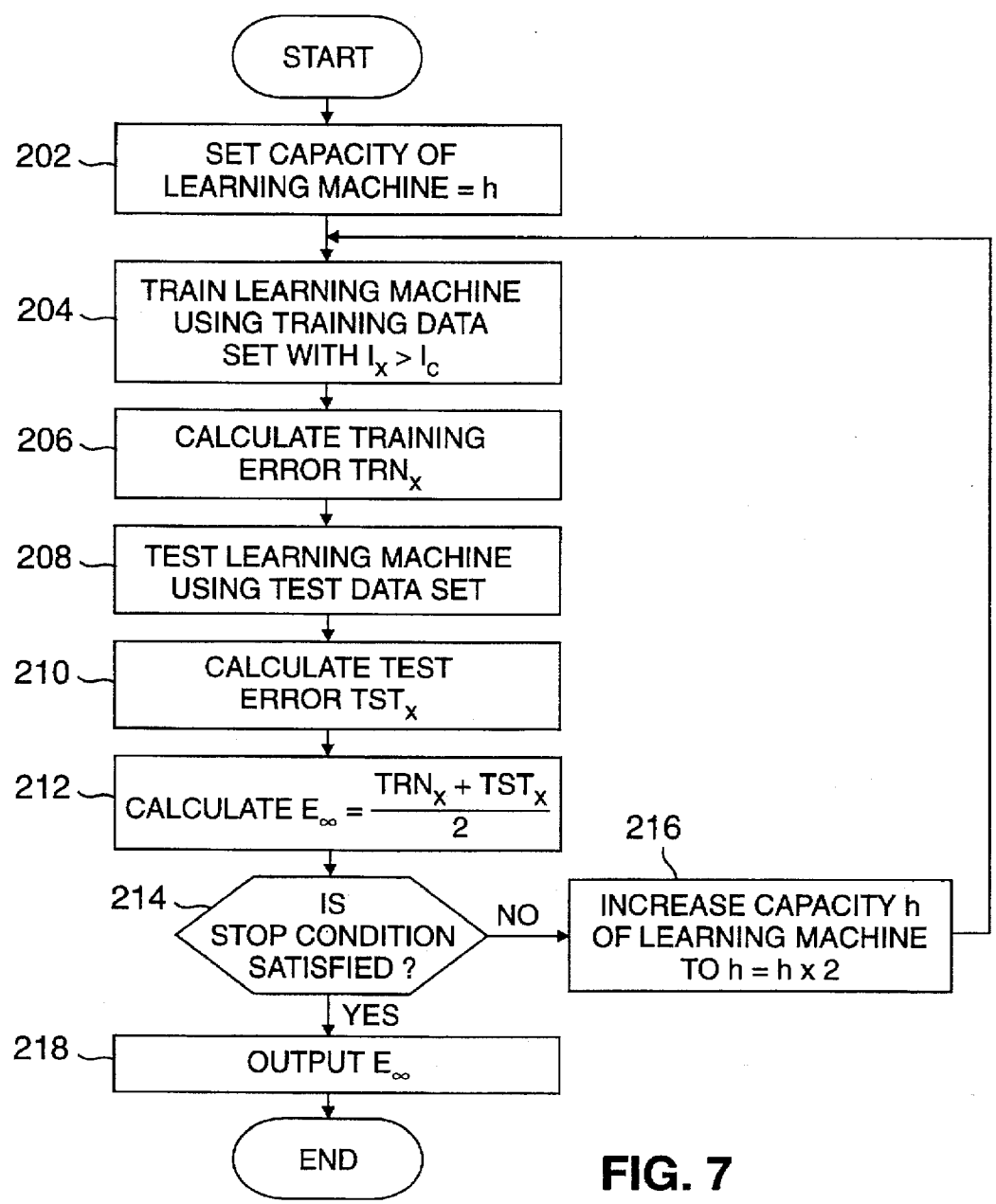
FIG. 7 shows a flow diagram of the steps for estimating the limiting performance of a learning machine imposed by data quality.

The method for estimating the value $E_m$ which represents the limiting performance on any given learning machine for a given set of data is described in conjunction with FIG. 7. In step 202, the learning machine is set to capacity h. In step 204 the learning machine is trained using a training data set of size $l_x$ where $l_x$ is greater than $l_c$. As described above, this will insure a training error 132 (FIG. 5) greater than zero. The training error $TRN_x$ is calculated in step 206. The learning machine is tested using the test data set in step 208. The test error $TST_x$ is calculated in step 210. In step 212 $E_\infty$ is calculated as $$E_\infty = \frac{TRN_X + TST_X}{2}.$$

In step 214 it is determined whether the stop condition is satisfied. As seen in FIG. 6, $E_\infty$ can be calculated for learning machines with increasing capacity h to estimate the value $E_m$. However, $E_\infty$ will most likely never reach $E_m$, and therefore the disclosed method is for determining an estimation of $E_m$. The continuing calculations of $E_\infty$ with a machine of increasing capacity h may be stopped at any point where $E_\infty$ represents an acceptable approximation of $E_m$. In a preferred embodiment the relative differences of consecutively calculated values of $E_\infty$ are compared to a predetermined stop value in order to obtain a desired accuracy (e.g., 5–10%). For example, if a first calculated value of $E_\infty$ is represented as $E_\infty^i$ and the next calculated value of $E_\infty$ is represented as $E_\infty^{i+1}$, then the relative difference D of the values is $$D = \frac{E_\infty^{i+1} - E_\infty^i}{E_\infty^i}.$$

Thus, if D is less than or equal to a predetermined stop value which represents the desired accuracy, then the stop condition has been reached. It has been found that a preferred accuracy is obtained when the relative difference D is in the range of 5–10%. However, other values may be used for the stop value in order to achieve the desired accuracy. If the stop condition is satisfied, the current value of $E_\infty$ represents the acceptable estimation of the value of $E_m$, and that value is output in step 218. If the stop condition is not satisfied, then the capacity h of the learning machine is increased. In a preferred embodiment, the capacity h is increased by a factor of two. However, the capacity h may be increased by other amounts. Control is passed to step 204 and the steps 204 through 216 are repeated until the stop condition is satisfied.

In the method described in conjunction with FIG. 7, the capacity h of the learning machine is increased in step 216 and steps 204 through 212 are repeated until the stop condition is satisfied. In an alternate embodiment, each time steps 204 through 212 are repeated, they could be performed on physically different learning machines, each with increasing capacity.

Figure 8:
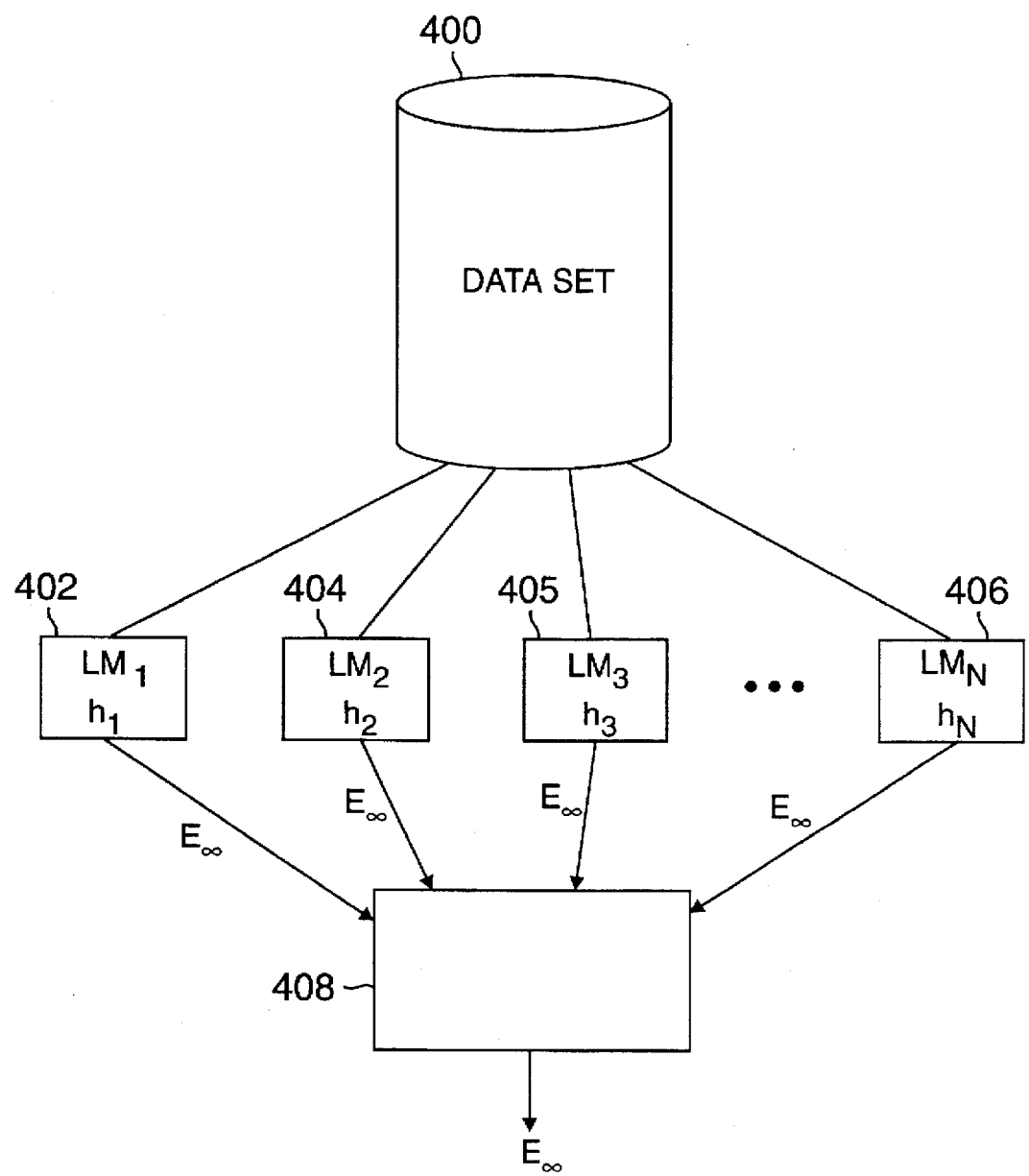
FIG. 8 shows a system for estimating the limiting performance of a learning machine imposed by data quality.

One system for estimating the value $E_m$ is described in conjunction with FIG. 8. FIG. 8 shows a data set 400, which includes both training data and test data. The training data from data set 400 is first provided to learning machine $LM_1$ 402 of capacity $h_1$. Learning machine $LM_1$ 402 is trained on the training data of data set 400 and the training error is calculated as described above in conjunction with FIG. 2. The test data from data set 400 is then provided to learning machine $LM_1$ 402. Learning machine $LM_1$ 402 is tested on the test data of data set 400 and the test error is calculated as described above in conjunction with FIG. 3. Learning machine $LM_1$ 402 computes the asymptotic error rate $E_\infty$ as described above and provides the asymptotic error rate $E_\infty$ to processor 408.

The training data from data set 400 is next provided to learning machine $LM_2$ 404 of capacity $h_2$, where $h_1 < h_2$. Learning machine $LM_2$ 404 is trained on the training data of data set 400 and the training error is calculated. The test data from data set 400 is then provided to learning machine $LM_2$ 404. Learning machine $LM_2$ 404 is tested on the test data of data set 400 and the test error is calculated. Learning machine $LM_2$ 404 computes the asymptotic error rate $E_\infty$ and provides the asymptotic error rate $E_\infty$ to processor 408.

Processor 408 will compare the asymptotic error rates $E_\omega$ provided from learning machines $LM_1$ 402 and $LM_2$ 404 to determine if a stop condition has been satisfied. This stop condition has been described above in conjunction with FIG. 7 and step 214. If the stop condition has been satisfied, then $E_\omega$ represents the estimate $E_m$ of the lowest error rate which can be achieved on the given data set 400 and $E_\omega$ is output. If the stop condition has not been reached, then learning machine $LM_3$ 405 of capacity $h_3$, where $h_1 < h_2 < h_3$, is trained and tested using data set 400 in a manner similar to that of learning machines $LM_1$ 402 and $LM_2$ 404, and the asymptotic error rate $E_\omega$ is provided to processor 408. Processor 408 will compare the asymptotic error rates $E_\omega$ provided from learning machines $LM_2$ 404 and $LM_3$ 405 to determine if a stop condition has been reached. If the stop condition has been reached, then $E_\omega$ represents the estimate $E_m$ of the lowest error rate which can be achieved on the given data set 400 and $E_\omega$ is output. If the stop condition has not been reached, then the above procedure is repeated on learning machines of increasing capacity, such that $h_1 < h_2 < h_3 < \ldots < h_N$, until the stop condition is reached.

FIG. 8 shows each of the learning machines $LM_1$ 402, $LM_2$ 404, $LM_3$ 405, through $LM_N$ 406, as separate units. Each of these learning machines $LM_1$ 402, $LM_2$ 404, $LM_3$ 405 through $LM_N$ 406 could be implemented using a separate computer system of the type described above in conjunction with FIG. 1. In an alternate embodiment, each of the learning machines $LM_1$ 402, $LM_2$ 404, $LM_3$ 405, through $LM_N$ 406, could be implemented in a single computer system of the type described above in conjunction with FIG. 1. Such an embodiment is possible since each of the learning machines may be trained and tested in sequence. In such an embodiment, the implementation of learning machines of increasing capacity could be implemented by increasing the number of hidden units where the learning machine is a neural network or by increasing the number of codebook vectors in a learning vector quantization machine. In such an embodiment, each of the learning machines $LM_1$ 402, $LM_2$ 404, $LM_3$ 405, through $LM_N$ 406 shown in FIG. 8 could be considered as virtual learning machines since they are implemented in a single computer system. In a similar manner, processor 408 could be implemented by the same computer system used to implement the virtual learning machines $LM_1$ 402, $LM_2$ 404, $LM_3$ 405, through $LM_N$ 406.

DETERMINING ACCURACY LIMIT OF LEARNING MACHINES FOR PREDICTING PATH PERFORMANCE DEGRADATION

Figure 9:
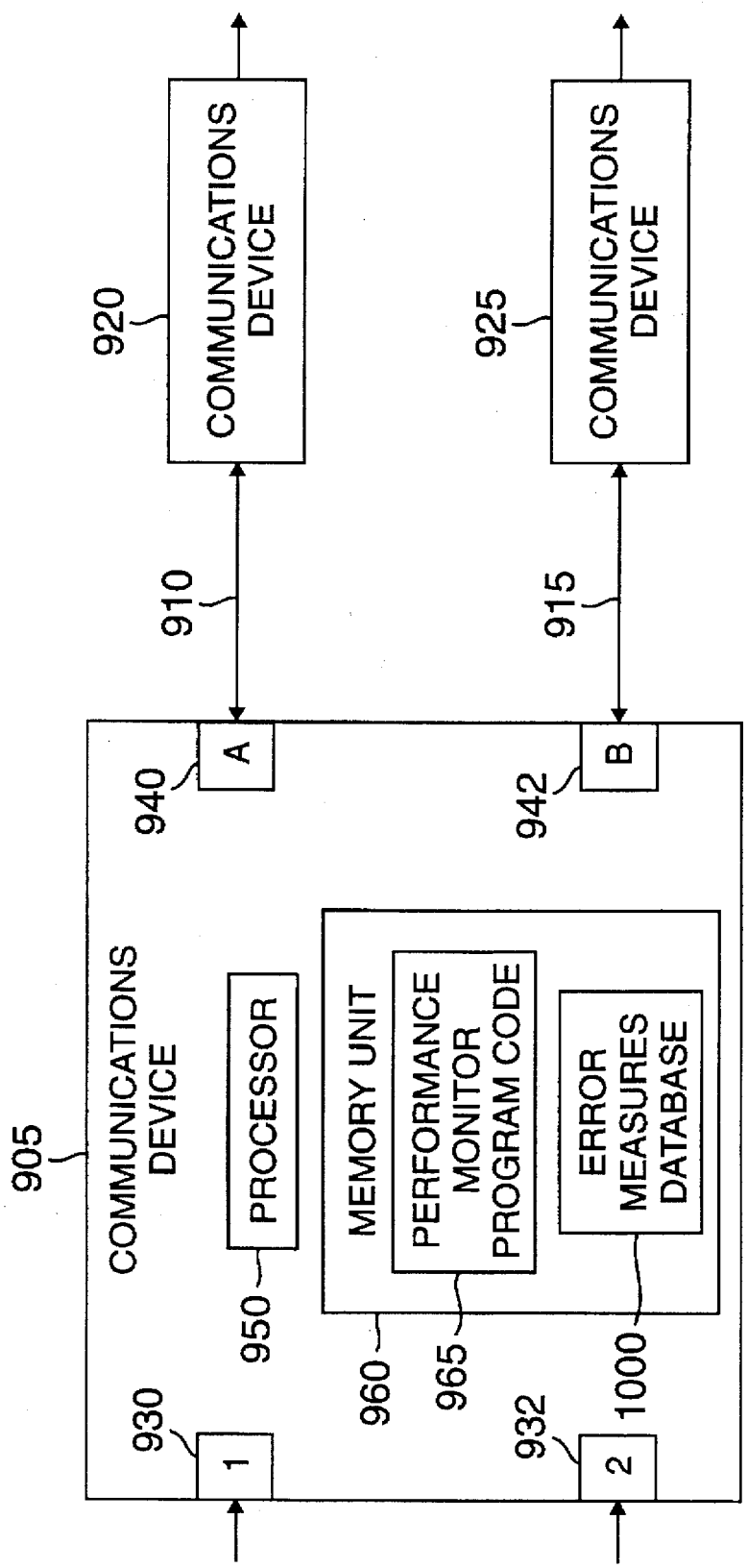
FIG. 9 shows a network environment comprised of communication paths for interconnecting at least two communications devices.

FIG. 9 shows communication paths 910 and 915 for interconnecting at least two communication devices 905, 920, 925, which may each be, for example, a communications switch, or a multiplexer/demultiplexer, such as a network termination equipment (NTE) device. The communication paths 910, 915 are suitable for transferring information, such as voice or data signals, between the communication devices 905, 920, 925. It is noted that while the communication paths 910 and 915 are illustrated as single, direct routes between two communications devices 905, 920, 925, the communication paths 910, 915 may actually consist of a combination of links and other communication devices, such as regenerators to enhance the transmitted signal.

For example, an individual communication path, such as the path 910, may specify a path from one city to another, such as a DS3 path in the AT&T communications network, and may include different kinds of physical links to complete the path 910, such as optical fiber, coaxial cable and digital radio links. It is noted that individual physical links in the path 910 may be interconnected by line terminating equipment (LTE). In order to maintain a sufficient level of service, particular physical links in a given path 910 may typically be exchanged with alternate redundant links in the event of performance degradation.

As shown in FIG. 9, each communications device, such as the communications device 905 shown in greater detail, may be comprised of one or more input ports, such as the input ports 930 and 932, and one or more output ports, such as the output ports 940 and 942. The communications devices 905, 920, 925 preferably include at least one processing unit 950 and a memory unit 960. The memory unit 960 preferably stores program code for a performance monitor 965, discussed further below, which monitors the performance of one or more communication paths connected to the communications device 905. The processor 950 is preferably configured to implement the performance monitor program code 965, in a known manner. When the communications device is embodied as a telecommunications switch, the memory unit 960 may additionally store the routing information and program code necessary to route calls that are received by the switch.

The performance monitor 965 continuously monitors performance parameters of the network and logs the results in one or more databases, in a conventional manner. The data recorded by the performance monitor 965 is preferably stored in an error measures database 1000, discussed below in conjunction with FIG. 10. It is noted that while there are numerous techniques for monitoring network performance, only one suitable method is discussed herein.

Typically, two types of errors are utilized to evaluate the performance of a communication path, namely, bit errors and framing errors. Thus, the performance monitor 965 preferably monitors each communication path, such as the path 910, associated with the communications device 905, 920, 925 and provides a bit error rate and framing error rate for each communication path. The bit error rate is defined to be the fraction of transmitted bits that are not correctly received at the termination of a path, such as the path 910. In one embodiment, the bit error rate is obtained by examining the error checking bits, such as cyclic redundancy check (CRC) bits, that are typically included in a transmitted cell, packet or frame along with the data.

In addition, a framing error for a communication path, such as the path 910, is defined herein to be a synchronization failure between the transmitter and the receiver for a given path, such as the path 910. It is noted that data is typically transmitted in blocks, called frames, which are delimited from one another by a predefined "end of frame" binary codeword. Thus, when a receiver begins receiving data associated with a particular frame, the receiver expects to receive the "end of frame" codeword to indicate that the complete frame has been received. Thus, if the "end of frame" codeword is not detected by the receiver within a predefined time-out period, a framing error has occurred for the associated path. It is noted that a framing error implies a significant number of bit errors.

In a preferred embodiment, the performance monitor 965 evaluates a plurality of error measures, defined below, which are based on bit and framing errors and quantify the performance of each path, such as the paths 910 and 915, preferably in 15 minute intervals. The illustrative error measures discussed herein have been found to accurately characterize the error distribution of a given path, by compensating for the burstiness typically associated with bit and framing errors.

Thus, a first illustrative error measure, low-bit-error rate, records the number of seconds in the 15 minute measuring interval having exactly one bit error. A second illustrative error measure, medium-bit-error rate, records the number of seconds in the 15 minute measuring interval having more than one, but less than 45 bit errors. A third illustrative error measure, high-bit-error rate, records the number of seconds in the 15 minute measuring interval having more than 45 bit errors. Finally, a fourth illustrative error measure, frame-error, records the number of seconds in the 15 minute measuring interval having a framing error.

Figure 10:
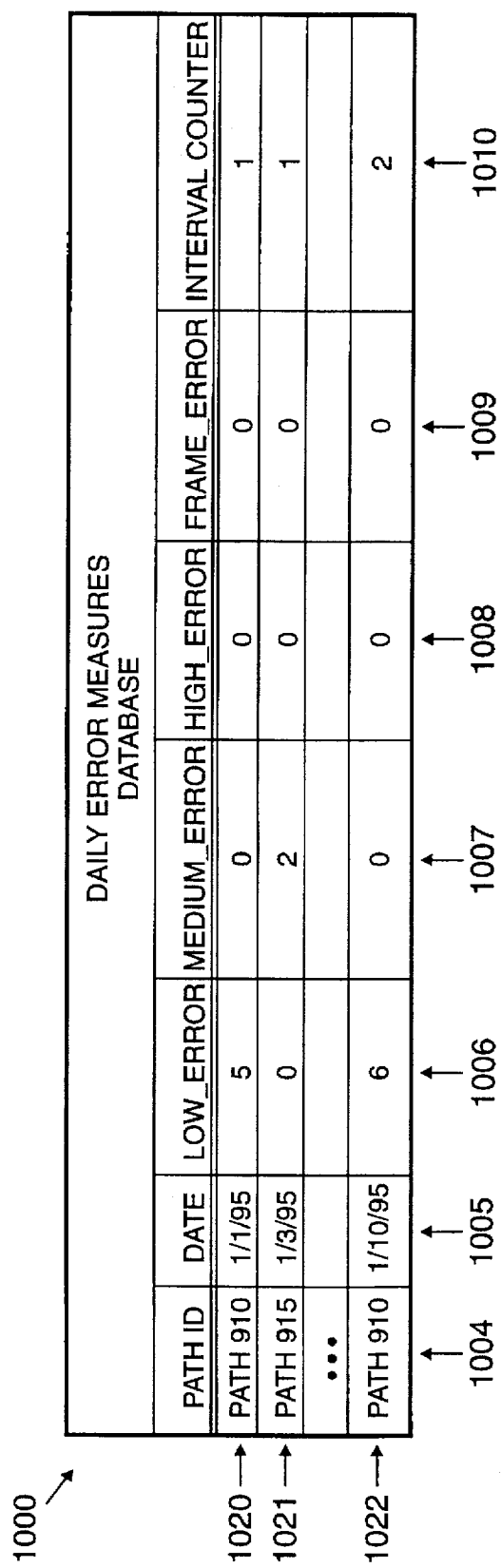
FIG. 10 shows a preferred implementation of a daily error measures database for recording error measures that characterize the performance degradations of communication paths.

One embodiment of a daily error measure database 1000, for recording the above error measures, is shown in FIG. 10. It is noted that a communication path will typically be error free most of the time. Thus, the performance monitor 965 will preferably make an entry in the daily error measure database 1000 only if one or more of the error measures for a 15 minute period are detected. Furthermore, if an entry has been previously made by the performance monitor 965 for a given path for a previous 15 minute interval in the same day, the data for the current 15 minute interval being reported is preferably added to the previously recorded values.

The daily error measure database 1000 preferably includes a plurality of columns 1004–1010, for recording the appropriate data for a given entry. Each row in the daily error measure database 1000, such as the rows 1020–1022, is associated with the daily error measure data for a particular path having at least one 15 minute interval in a 24 hour daily period which satisfies the predefined reporting criteria.

As shown in FIG. 10, a column 1004 preferably records the pathid, which identifies the particular communication path 910, 915 associated with the reported data. In addition, a column 1005 preferably records the date associated with the given entry. The entries in column 1006 record the daily low-bit-error rate, namely, the accumulated number of seconds during the 24 hour period having exactly one bit error. The entries in column 1007 record the daily medium-bit-error rate, namely, the accumulated number of seconds during the 24 hour period having more than one, but less than 45 bit errors. The entries in column 1008 record the daily high-bit-error rate, namely, the accumulated number of seconds during the 24 hour period having more than 45 bit errors. The entries in column 1009 record the daily frame-error, namely, the accumulated number of seconds during the 24 hour period having a framing error.

In addition, an entry in column 1010 preferably contains an interval counter that is incremented each time an entry is made in the daily error measures database 1000, in other words, whenever an error is detected in a 15 minute interval. Thus, the interval counter records the accumulated number of 15 minute intervals for a given day which have been reported to the daily error measures database 1000 for the associated path.

As previously indicated, the historical data stored in the daily error measures database 1000 can be evaluated to identify communication paths, such as the paths 910, 915, that will likely exhibit performance problems in the future. Thus, according to a feature of the present invention, a learning machine 302, discussed above in conjunction with FIGS. 3 and 4, is utilized to classify the historical path performance data for a communication path 910 that may be stored in the daily error measures database 1000 and to thereafter assign a label to the data indicating whether or not the associated communication path 910 will likely exhibit performance degradation in some predefined future window.

The learning machine 302 utilizes internal parameters to classify the input data, in a known manner, by utilizing a learning algorithm to implement an input-output relationship during a training phase, wherein a training data set is provided to train the learning machine. As discussed below, the training data set includes a number of records from the daily error measures database 1000, along with labels indicating the correct classification of the input data, namely, whether the associated communication path actually exhibited performance degradation during a predefined future period. The learning machine adjusts the internal parameters so that the labels produced by the learning machine in response to the training set match, as well as possible, the indicated labels. Once the training sequence of the learning machine is complete, the classification ability of the machine is estimated by the performance of the learning machine on a test data set, which the learning machine has not previously analyzed.

It is preferred that the historical data includes a sufficient number of days to provide an adequate representation of the state of the communication path 910. In addition, however, the number of days included in the historical data should be limited such that there is a manageable amount of data to be analyzed by the learning machine 302. It has been found that historical data consisting of the current day and 20 previous days provides a suitable balance of accuracy and computational manageability. Thus, since there are five data elements per day for each entry in the daily error measures database 1000, including the interval counter, the historical data consists of 105 data elements for each communication path 910.

Figure 11A:
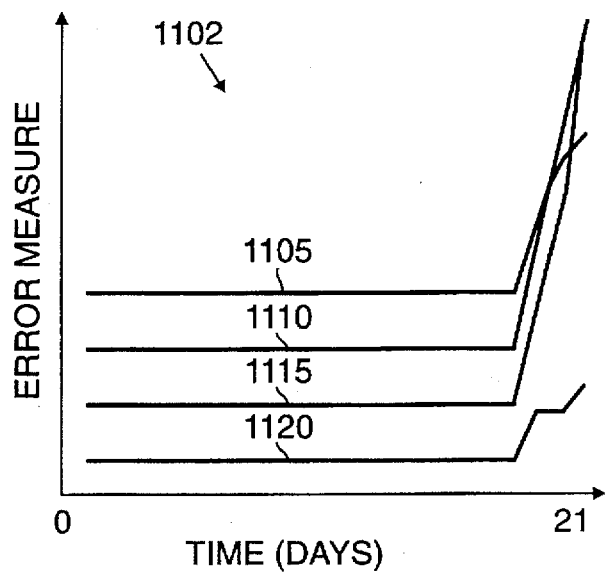
FIGS. 11A, 11B and 11C each show a graphical illustration of the path performance distributions for a 21 day historical period for a particular communication path.
Figure 11B:
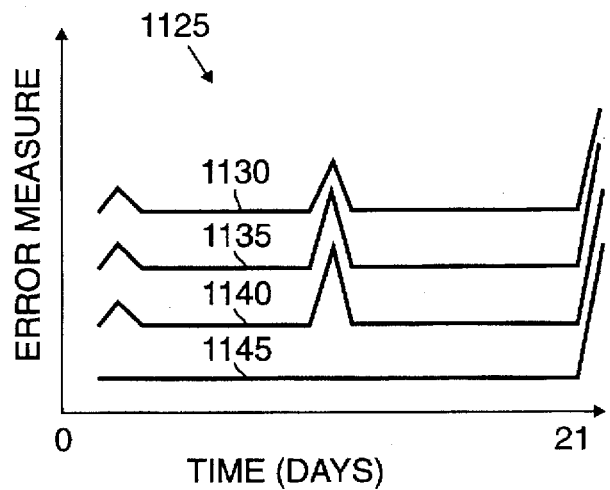
Figure 11C:
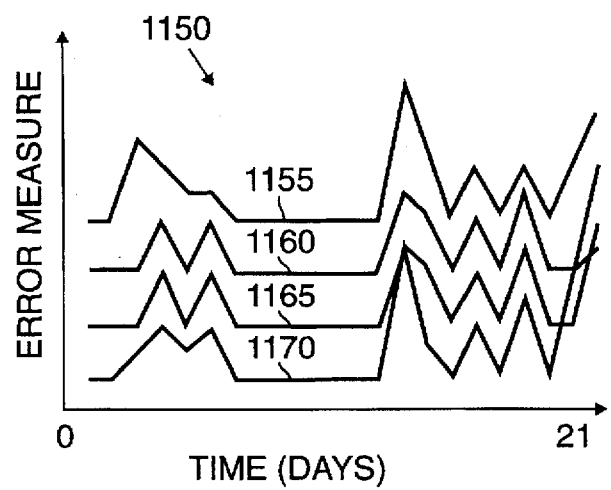

FIGS. 11A through 11C illustrate path performance distributions 1102, 1125 and 1150, respectively, for a 21 day historical period for particular communication paths, such as the path 910. Each path performance distribution is comprised of the four error measures for a given path, as defined above. For example, the path performance distribution 1102 plotted in FIG. 11A is comprised of plots of the frame error 1105, the high-bit-error 1110, the medium-bit-error 1115, and the low-bit-error 1120 over the 21 day historical period.

It is noted that a requirement of the data extraction process is that the path performance degradation exceed the predefined threshold on day 21. Thus, all paths, by definition, will exhibit performance degradation on day 21. However, the presence of errors on the other 20 days in the history may be randomly distributed. For example, the path performance distribution 1102 shown in FIG. 11A is characterized by significant errors on days 19 through 21, but is essentially error free for the first 18 days in the historical period. The path performance distributions 1125 and 1150, on the other hand, shown in FIGS. 11B and 11C, are characterized by errors throughout the 21 day historical period.

In addition to the historical data for a given communication path 910, the training and test data required for the learning machine 302 includes a label associated with the data for a given path 910, which indicates whether or not the associated communication path 910 actually exhibited performance degradation in some predefined future window following the historical period. In a preferred implementation, the predefined future window consists of the seven day period immediately following the 21 day history. In an illustrative implementation, the label is set to indicate performance degradation for the following seven day period only if the communication channel exhibited one of the following two characteristics: at least one high-bit-error or a frame-error in the given day or the next seven days, or if at least four of the next seven days had at least one low-bit-error.

Thus, in an illustrative implementation, the training and test data sets are generated by retrieving all data sets from the daily error measure database 1000 that satisfy the following criteria: the communication path, such as the path 910, on a given day exhibited at least three low-bit-errors; the daily error measure database 1000 contains data for the communication path for at least 20 days prior to the given day and at least seven days following the given day; and the same communication path 910 did not have any high-bit-errors or frame-errors during the given day or previous 20 days. It is noted that cases with high-bit-errors or frame-errors in the 21 day historical period are excluded because these errors would typically be immediately flagged for investigation and resolution by a technician.

Thus, the training and test data sets may be generated by applying the above criterion to the data entries in the daily error measure database 1000. Each set of extracted data constitutes a "case" consisting of the 105 error measure values for the 21-day historical period, as well as a label indicating whether the communication path exhibited performance degradation in the following seven day period.

Thereafter, the extracted cases should be divided into a training data set and a test data set. As a general guideline, the extracted cases should be randomly distributed such that, for example, two-thirds of the data is in the training data set and one-third of the data is in the test data set. In addition, however, the training and test data sets should preferably have virtually identical distributions of labels indicating performance degradation in the following seven day period.

The training of the learning machine 302 for predicting path performance degradation is performed in the manner described above, in conjunction with FIG. 2. The vector input data 308, shown in FIG. 2, is comprised of the training data sets extracted from the daily error measures database 1000. The associated labels 310 are comprised of the labels indicating the correct classification of each training data case, namely, whether the associated communication path actually exhibited performance degradation during the predefined future period.

The testing of the trained learning machine 302 for predicting path performance degradation is performed in the manner described above, in conjunction with FIG. 3. The vector input data 322, shown in FIG. 3, is comprised of the test data sets extracted from the daily error measures database 1000. The associated labels 324 are comprised of the labels indicating the correct classification of each test data case, namely, whether the associated communication path actually exhibited performance degradation during the predefined future period.

The accuracy limit, $E_\omega$, of learning machines for predicting path performance degradation using the path performance data provided by the performance monitor 965 may be obtained by employing the process for estimating the limiting performance of any learning machine, described above in conjunction with FIG. 7; or, alternatively, by employing the system for estimating the limiting performance of any learning machine, described above in conjunction with FIG. 8. The performance limit estimation process of FIG. 7 is performed for various learning machines of various capacities for the given path performance data. The result of the performance limit estimation process of FIG. 7 is the accuracy limit imposed by the quality of the path performance data for any learning machine capable of predicting path performance degradation.

As shown in FIG. 4, the optimal test error 120 is obtained for a learning machine capacity, $h^*$, which is smaller than the capacity for which zero error is obtained in the training set. As previously indicated, for capacities that are greater than $h^*$, the learning machine capacity is too high, overfitting the training data set, such that the additional capacity is applied to learning vagaries of the training data set which are not reproduced in the test set. Thus, after performing the performance limit estimation process of FIG. 7 for various learning machines of various capacities for the given path performance data, the training and test errors can be plotted as shown in FIG. 4, and the learning machine having a capacity of $h^*$, which exhibits the minimum test error, can be selected.

A method and apparatus for determining the accuracy limit of learning machines for predicting path performance degradation imposed by the quality of the path performance data is disclosed. It is to be understood that the embodiments shown and described herein are only illustrative of the principles of the present invention and that various modifications may be implemented by those skilled in the art without departing from the scope and spirit of the invention. In particular, although the invention has been disclosed herein in terms of illustrative path performance error measures, and particular criteria for reporting performance degradation to the database 1000, and for assigning labels to the future path performance, other suitable error measures and criteria could be utilized without departing from the scope or spirit of the invention, as would be apparent to a person of ordinary skill in the art based on the discussion herein.

We claim:

1. A method for determining an accuracy limit of a learning machine for predicting path performance degradation in a telecommunications network, said learning machine analyzing a performance data set for a path having an intrinsic noise level, said path performance data set comprising a training data set and a test data set, the method comprising the steps of:

a) training a learning machine having a capacity to produce a classification of said path performance data set using said training data set and calculating a training error, said classification indicating whether said path will likely exhibit a performance degradation in the future;

b) testing said learning machine using said test data set and calculating a test error;

c) calculating an asymptotic error rate based on said test error and said training error;

d) determining whether a stop condition has been satisfied; and e) if the stop condition is not satisfied, repeating steps a) through d) until said stop condition is satisfied, wherein each repetition of said steps is performed in conjunction with a learning machine having a capacity greater than that of the previous repetition of said steps.

2. The method of claim 1 wherein step c) further comprises calculating the mean of said test error and said training error.

3. The method of claim 1 wherein step d) further comprises comparing the relative difference of the calculated asymptotic error rates to a predetermined stop value.

4. The method of claim 3 wherein the comparing step further comprises comparing the relative difference of the calculated asymptotic error rates to a predetermined stop value which is in the range of 5 to 10 percent.

5. The method of claim 1 wherein said training data set has a size sufficient to have a training error that is greater than zero.

6. A method for determining an accuracy limit of a learning machine for predicting performance degradation of a path in a telecommunications network, said learning machine analyzing a path performance data set comprising training data and test data, the method comprising the steps of:
   a) training a learning machine having a capacity to produce a classification of the path performance data in said data set using said training data and calculating a training error, said classification indicating whether said path will likely exhibit a performance degradation in the future;
   b) testing said learning machine using said test data and calculating a test error;
   c) calculating an asymptotic error rate based on said training error and said test error;
   d) determining whether a stop condition is satisfied;
   e) if said stop condition is not satisfied then increasing the capacity of said learning machine and repeating steps a) through d) until said stop condition is satisfied; and
   f) if said stop condition is satisfied then outputting said asymptotic error rate as the limit on learning machine accuracy imposed by said given path performance data set.

7. The method of claim 6 wherein said learning machine is a neural network having at least one hidden unit defining the capacity of said learning machine and wherein said step of increasing the capacity of said learning machine further comprises increasing the number of hidden units of said neural network.

8. The method of claim 6 wherein said learning machine is a learning vector quantization machine having at least one codebook vector defining the capacity of said learning machine and wherein the step of increasing the capacity of said learning machine further comprises increasing the number of codebook vectors of said learning vector quantization machine.

9. The method of claim 6 wherein the step of increasing the capacity of said learning machine further comprises increasing said capacity by a factor of 2.

10. The method of claim 6 wherein step d) further comprises comparing the relative difference of the calculated asymptotic error rates to a predetermined value.

11. The method of claim 10 wherein the comparing step further comprises comparing the relative difference of the calculated asymptotic error rates to a predetermined stop value which is in the range of 5 to 10 percent.

12. A system for determining an accuracy limit of a learning machine for predicting performance degradation of a path in a telecommunications network said accuracy limit being imposed by data integrity, said system comprising:
   a path performance data set having training data and test data;
   a plurality of learning machines, each having a unique capacity, each of said learning machines comprising:
      a) means responsive to said data set for training said learning machine to produce a classification of said path performance data using said training data and for calculating a training error, said classification indicating whether said path will likely exhibit a performance degradation in the future;
      b) means responsive to said data set for testing the classification ability of said learning machine using said test data and for calculating a test error;
      c) means for calculating an asymptotic error rate based on said training error and said test error; and
      d) means for comparing said asymptotic error rates to determine whether a stop condition has been reached and for outputting the asymptotic error rate as an estimated limit of the accuracy of said learning machine for predicting path performance degradation imposed by the data integrity of said path performance data when said stop condition is reached.

13. The system of claim 12 wherein said means for calculating the asymptotic error rate of said training error and said test error further comprises means for calculating the mean of said training error and said test error.

14. The system of claim 12 wherein said means for comparing said asymptotic error rates to determine whether a stop condition has been reached further comprises means for comparing the relative difference of said asymptotic error rates to a stop value.

15. The system of claim 14 wherein said stop value is in the range of 5 to 10 percent.

16. The system of claim 12 wherein said training data is of sufficient size such that said calculated training error is greater than zero.

17. An apparatus for determining an accuracy limit of a learning machine for predicting performance degradation of a path of a telecommunications network imposed by a data set comprising:
   a storage unit storing a path performance data set having training data and test data;
   a memory unit containing computer program code;
   a processor for executing said computer program code to implement separately a plurality of virtual learning machines, each implemented virtual learning machine having a different capacity;
   means for training each of said implemented virtual learning machines to produce a classification of said path performance data set using said training data and for calculating a training error, said classification indicating whether said path will likely exhibit a performance degradation in the future;
   means for testing the classification ability of each of said implemented virtual learning machines using said test data and for calculating a test error;
   means for calculating the asymptotic error rate of said training error and said test error for each of said implemented virtual learning machines; and
   means for comparing said asymptotic error rates to determine the accuracy limit of said learning machine for predicting path performance degradation imposed by said path performance data set.

18. The apparatus of claim 17 wherein said comparing means further comprises:
   means for comparing to a stop value the relative difference of said asymptotic error rates of a first implemented virtual learning machine and a second implemented virtual learning machine, the second implemented virtual learning machine having a capacity greater than the first implemented virtual learning machine; and means for outputting the asymptotic error rate as the limit on learning machine accuracy imposed by said data set when said relative difference is equal to or less than said stop value.

19. The apparatus of claim 18 wherein said stop value is in the range of 5 to 10 percent.

20. The apparatus of claim 17 wherein said calculating means further comprises means for calculating the mean of said training error and said test error.

21. A system for determining an accuracy limit of a learning machine for predicting performance degradation of a communication path in a telecommunications network, said accuracy limit being imposed by data integrity, said system comprising:

a performance monitor for monitoring performance parameters of said communication path and for generating path performance data which characterizes the error distribution of said communication path;

means for separating said generated path performance data into a training data set and a test data set;

a plurality of learning machines, each having a unique capacity, each of said learning machines comprising:

a) means responsive to said path performance data set for training said learning machine to produce a classification of said path performance data using said training data and for calculating a training error, said classification indicating whether said path will likely exhibit a performance degradation in the future;

b) means responsive to said data set for testing the classification ability of said learning machine using said test data and for calculating a test error;

c) means for calculating an asymptotic error rate based on said training error and said test error; and means for comparing said asymptotic error rates to determine whether a stop condition has been reached and for outputting the asymptotic error rate as an estimated limit of the accuracy of said learning machine for predicting path performance degradation imposed by the data integrity of said path performance data when said stop condition is reached.

22. The system of claim 21, wherein said performance monitor generates a bit error rate and a framing error rate for said communication path.

23. The system of claim 22, wherein said bit errors and said framing errors are included in said path performance data set only when said bit errors and said framing errors exceed one or more predefined thresholds.

24. The system of claim 21, wherein said training data set and said test data set evaluated by said learning machine are comprised of historical path performance data for a predefined historical period and a label indicating whether said communication path actually exhibited performance degradation in a predefined future period following said historical period.

* * * * *